J. O. BENNETT.
CORN-PLANTER.
No. 191,915. Patented June 12, 1877.
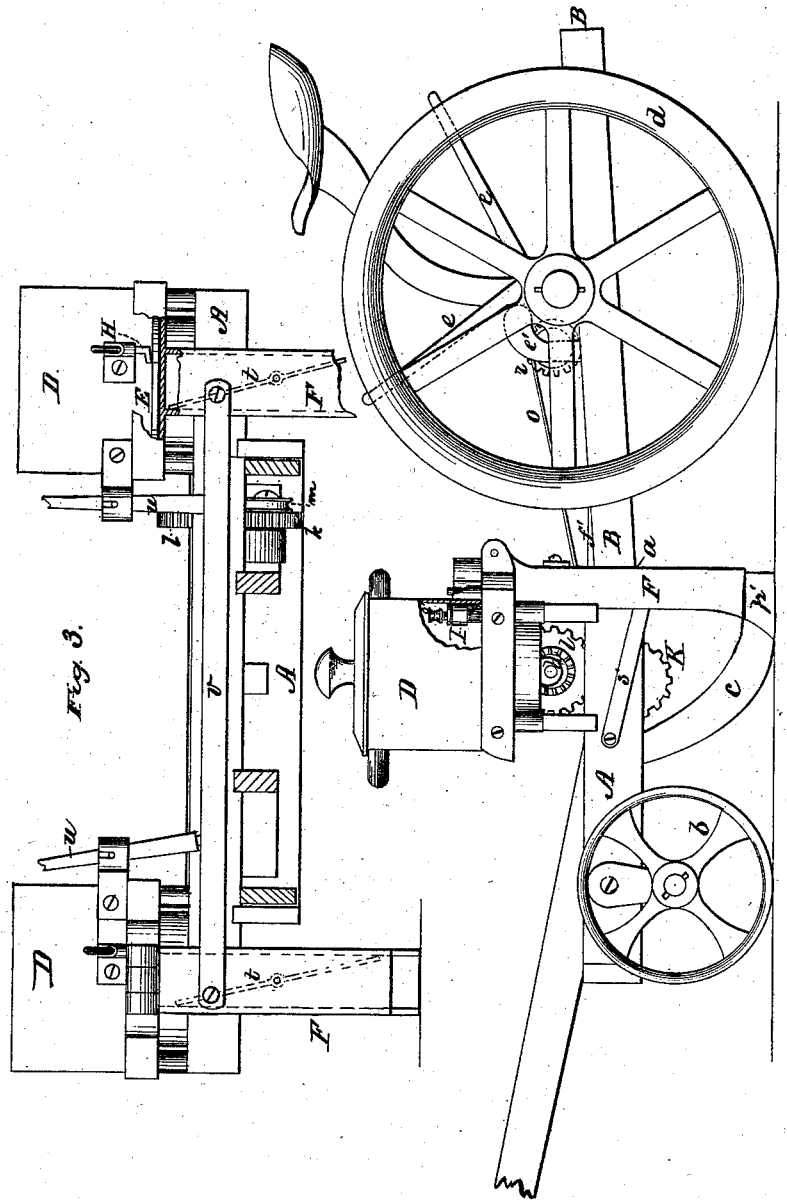
Witnesses:
Wm Hamilton
H A Church
Inventor:
John O. Bennett

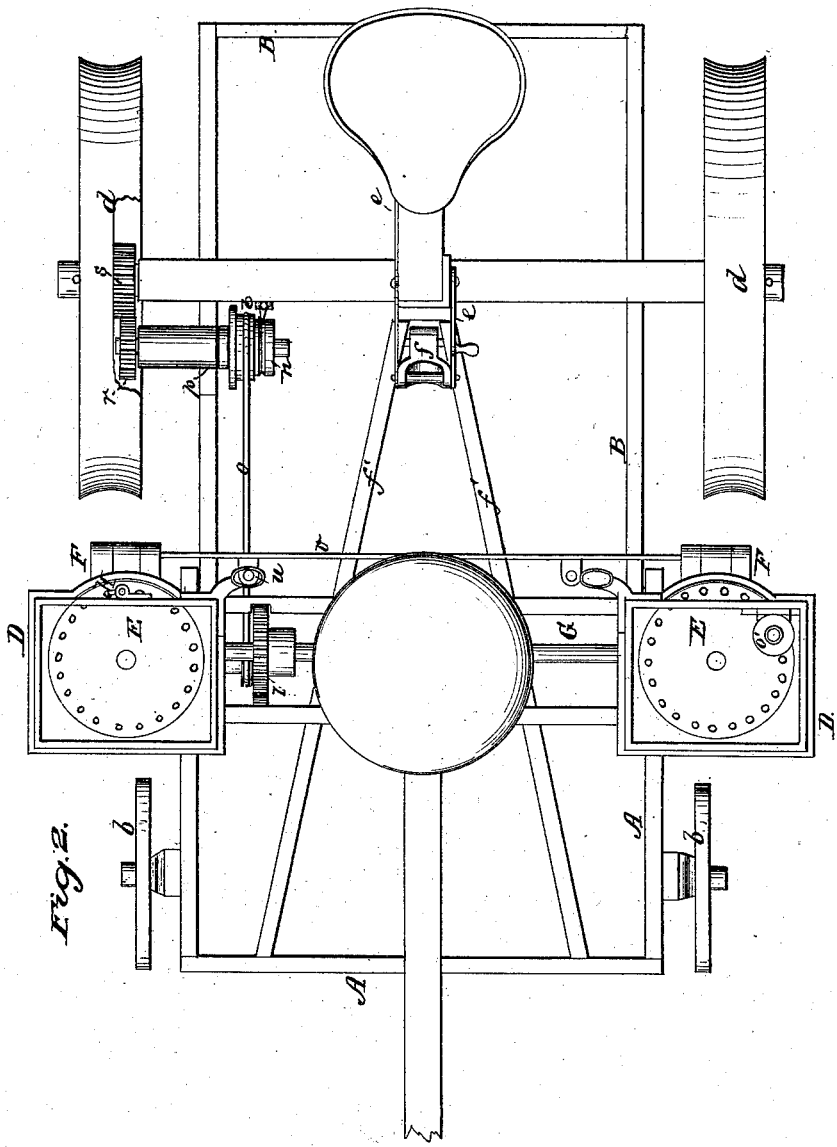

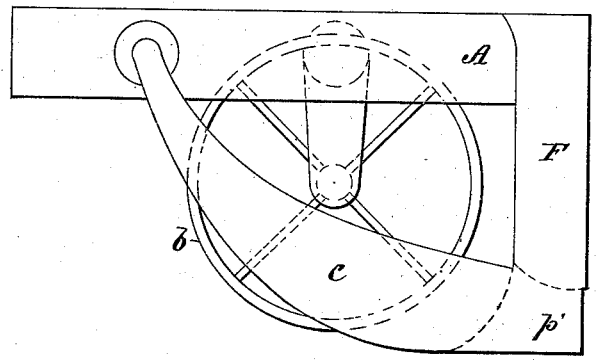
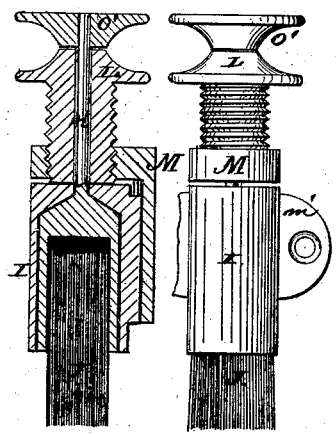
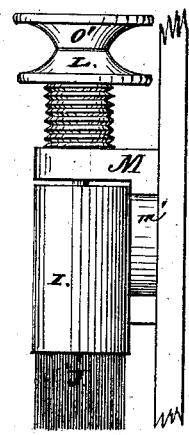
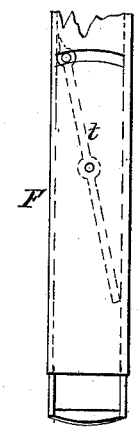
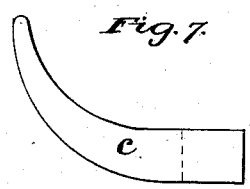

UNITED STATES PATENT OFFICE.

JOHN O. BENNETT, OF URBANA, OHIO.

IMPROVEMENT IN CORN-PLANTERS.

Specification forming part of Letters Patent No. 191,915, dated June 12, 1877; application filed December 11, 1876.

*To all whom it may concern:*

Be it known that I, JOHN O. BENNETT, of Urbana, in the county of Champaign and State of Ohio, have invented a new and useful Improvement in Corn Drills and Planters; and I do hereby declare that the following is a full, clear, and exact description of the same.

The invention relates to the construction and arrangement of parts, as hereinafter described and claimed.

In the accompanying drawing, forming part of this specification, Figure 1 is a side elevation, and Fig. 2 a plan view, of the machine. Fig. 3 is a cross-section taken just in rear of the seed-boxes. Figs. 3ª, 4, 4ª, 5, and 6 are detail views. Fig. 7 illustrates the old method of constructing the furrow openers or cutters and the seed-spouts.

The frame of the machine consists of two parts, A B, connected by a loose joint, the forward part, A, carrying the seed-dropping mechanism proper, and being supported upon small wheels $b$ and sod or soil cutters $c$, while the rear part, B, has the driver's seat attached, and is supported by large transporting-wheels $d$. The angle of the two parts A B relative to each other and the surface of the ground may be changed or adjusted at will by means of levers whose longer arms $e$ are set at a considerable angle to each other, Figs. 1, 2, and whose curved extensions or arms $e'$ are connected by a link, $f$, to the ends of bars $f'$, attached rigidly to the forward frame A. The double or two-armed lever $e\ e'$ is pivoted at its angle to frame B, so that, by adjusting the position of the same on its fulcrum, the frames A B will be adjusted correspondingly, thereby adjusting the sod-cutters, and causing them to run deeper or shallower, as required.

The bottom of seed-hoppers D is formed of disks or circular plates E, having perforations near the edge, into which the seed is received, and from which it is discharged, as the disks rotate over the open mouth of seed-conducting tubes or spouts F. They are rotated by gears $h$, mounted on shaft G, which engage suitable teeth formed on the under side of the disks. Rotary motion is imparted to the shaft G by means of a belt-and-gear connection with one of the transporting-wheels $d$—namely, gears $k$ and $l$, pulleys $m\ n$, belt $o$, shaft $p$, and gears $r\ s$.

H, Fig. 3, is a device for clearing the disk of kernels or seed. The device is a bar sliding vertically in a guide, and having an arm whose point rests on the disk. As the latter rotates the arm travels over it in the line of the perforations, thus knocking out the kernels.

Valves $t\ t$, Figs. 3 and 6, are pivoted in the seed-conducting tubes F, and may be adjusted in position by lever $u$ and a bar, $v$, which connects the valves, as shown in Fig. 3. When drilling seed the valves $t$ are allowed to hang vertically; but when it is desired to plant the seed in hills, the lever $u$ is operated to cause the valves to assume the position shown in Figs. 3 and 6, and to retain such position long enough to arrest seed sufficient in quantity for a hill. The lever $u$ is then vibrated again to shift the valves and cause them to assume the opposite inclined position and collect seed, as before.

The cut-off brushes J, Figs. 4, 4ª, and 5, are placed in one corner of the seed-hoppers, to co-operate with the seed-disks, as usual in planters. To provide for adjustment of the brush, I confine it in a tubular holder, which fits in a socket, I. The latter has a dovetailed projection on its side, which fits between inclined flanges formed on the vertical part of an angular bracket, M, having perforated lugs $m'$, through which screws are inserted to attach the device to the side of the seed-hopper. The brush-holder has a stem, $n'$, which passes up through a tubular screw, L, which screws into the horizontal arm of bracket M. A button, $o'$, is fixed on the end of the stem, and the screw has a milled rim or head. The advantages of this construction are, that the brush-holder and socket may be easily detached when a new brush is required, or for other purposes, and the brush may be adjusted higher or lower, according to the pressure with which it is required to bear on the perforated disk, or to compensate for wear. The adjustment is effected by turning the screw, one end of which bears on the head of socket I, and the other against the under side of button $o'$, the latter being adjusted correspondingly, so that the brush-holder is held snug against the upper end of its socket.

The remaining feature of my invention is the mode of connecting the curved soil-cutters and foot of the seed-spout. According to the old method (illustrated in Fig. 7) the cutter is welded to the foot or hoe on a vertical line; but my plan consists in uniting them upon the oblique or curved line. (Shown in Fig. 3ª.) My hoe $p'$ has nearly the form of a horse's hoof, so that it will run, like a plowshare, under the soil, and not merely through it, as the old form of foot for seed-conducting spouts does. The advantage of my construction is that the soil is lifted and pulverized, instead of packed, as by the old form, and thus left in better condition for the favorable growth of the seed.

When the soil-cutters $c$ are not employed, I attach a brace, $s'$, Fig. 1, to the hinged seed-tubes by means of a wooden pin, so that when the foot $p'$ encounters a root, rock, or other resisting obstacle, the pin will break and allow the seed-tube to turn on its hinge without causing injury to the machine.

What I claim is—

In a corn-planter, the cut-off brush-holder having the screw-stem $n'$, the socket I, having a dovetail projection on its side, the nut or button $o'$, the tubular screw L, having a circumferential flange, and the angular bracket M, all constructed and arranged as shown and described, whereby the brush may be adjusted up or down and held in any adjustment, as specified.

JOHN O. BENNETT.

Witnesses:
WM. HAMILTON,
H. A. CHURCH.